Nov. 18, 1969          G. HIRS          3,479,002

RESILIENT TUBULAR VALVE

Filed May 11, 1967          3 Sheets-Sheet 1

INVENTOR.
GENE HIRS.
BY
WILSON, SETTLE & BATCHELDER
ATT'YS.

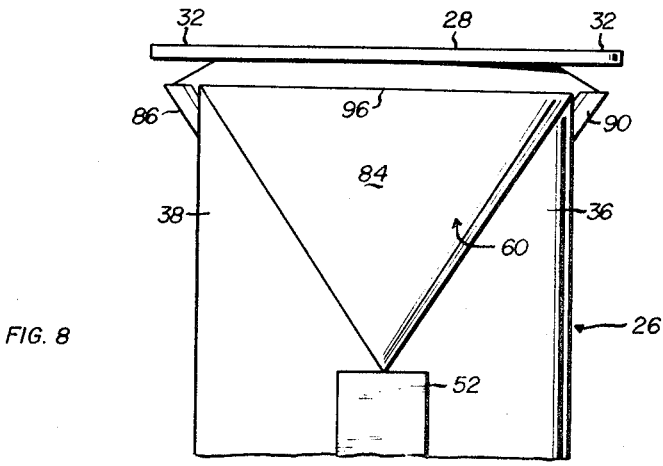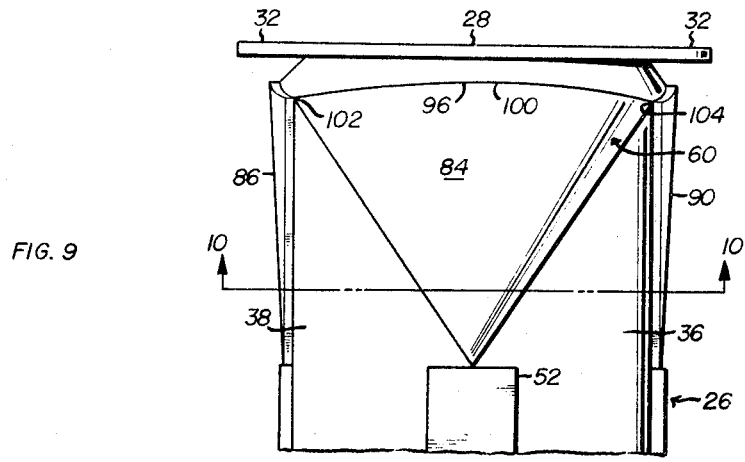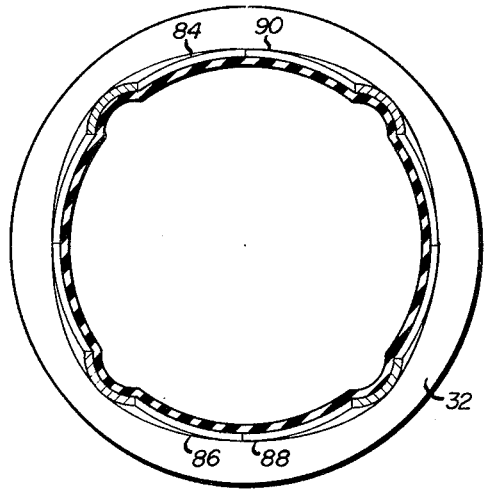

United States Patent Office 3,479,002
Patented Nov. 18, 1969

3,479,002
RESILIENT TUBULAR VALVE
Gene Hirs, 6865 Meadowlake,
Birmingham, Mich. 48010
Filed May 11, 1967, Ser. No. 637,670
Int. Cl. F16l 55/12; F16k 7/07
U.S. Cl. 251—5    13 Claims

ABSTRACT OF THE DISCLOSURE

A valve is provided including a rigid tubular casing, and an essentially tubular valve member made of resilient flexible material and having an axial passage extending through the valve member. The valve member is coaxial with the casing and has circular end portions which are sealed to said casing, so that the space between said valve member and said casing is sealed off. The material of the valve member between its circular end portions is folded to double thickness, and the folds extend axially of the valve member and radially to the axis of the valve member, so that the folds normally meet at the axis to close the passage through the valve member. The valve member, as formed, thus has cusp portions of segmental conical configuration between the folds slanting inwardly from the circular end portions to the axis of the valve member to provide a transition from the circular end portions to the folded portions. The cusp portions are reinforced by rigid backing members adhered to the exterior of the valve member and closure blocks are located at the juncture of the fold lines. The folds are expandable when the pressure inside the valve member exceeds the pressure outside the valve member to open the axial passage, the backing members and the closure blocks moving outwardly with the valve member. There is at least one inlet leading through the casing for introducing fluid under pressure into the casing on the outside of the valve member to apply pressure to the valve member to close the axial passage by virtue of the folds meeting at the axis of the valve member. The rigid backing members and the closure blocks control the folding of the tubular valve member to insure full closing of the valve member.

BACKGROUND OF THE INVENTION

Most valves for controlling the flow of fluids and particulate material have moving parts which are susceptible to wear. The abrasive action of fluids and particulate material also exerts a wearing influence on known valve mechanism which can wear out some portion of the valve mechanism in a fairly short time. Moving parts and cooperating mechanisms of known valve constructions also tend to make the valve somewhat complicated and difficult to manufacture, and costs of manufacture are sometimes unduly high.

SUMMARY OF THE INVENTION

The present invention provides a valve which has no mechanisms, and the construction of the valve is unusually simple and easy to manufacture. The heart of the valve is a flexible valve member which has an axial passage extending through it, and which is folded and arranged so that folded portions of the valve member meet each other at the axis of the valve to close off the valve passage. The valve member has circular end portions which are sealed to a tubular casing in which the valve member is provided so that the space between the valve member and the tubular casing is sealed off. Thus, pressure may be applied to the flexible valve member to close off the axial passage by introducing fluid under pressure through an inlet in the valve casing. When the pressure inside the valve member is greater than the pressure outside the valve member, the valve member expands to open the axial passage. The valve member also has cusp portions slanting from the circular ends to the axis of the valve member to provide a transition between the circular ends and the folded regions of the valve member, and these cusp portions are preferably stiffened by rigid members affixed thereto which are coextensive with the cusp portions and prevent distortion of the cusp portions when the valve member is under pressure. In cases where the valve member has at least three cusp portions, there are apex corners between the folded portions of the valve member, and these apex corners are preferably stiffened by substantially rigid blocks which fit into the apex corners and reinforce them. There is at least one inlet leading through the rigid casing to allow fluid under pressure to be introduced into the casing for applying pressure to the valve member to close the axial passage through it.

Accordingly, it is an object of the present invention to provide an improved valve which has no working mechanisms.

Another object of the invention is to provide a valve in which a valve member made of resilient, flexible material is folded and arranged to provide a valve configuration which can be closed by applying pressure to the outside of the valve member and which can be opened when the internal pressure exceeds the external pressure.

Another object of the invention is to provide a valve with a flexible valve member having circular ends, folded portions between the ends, and cusp portions providing a transition from the circular ends to the folded material, and rigid means stiffening the cusp portions to prevent distortion of the cusp portions when pressure is applied to the valve member.

A further object of the invention is to provide a flexible valve member having folded portions which meet at an axis of the valve member and define apex corners between adjacent folds, and stiffening blocks reinforcing the apex corners so that the corners meet internally of the valve member when pressure is applied to the valve member.

Other objects of this invention will appear in the following description and appended claims, reference being had to the accompanying drawings forming a part of this specification, wherein like reference characters designate corresponding parts in the several views.

On the drawings:

FIGURE 8 is a fragmentary elevational view of the valve member in a closed position;

FIGURE 9 is an elevational view similar to FIGURE 8 but showing the valve member in an open position; and FIGURE 10 is a sectional view taken along line 10—10 of FIGURE 9.

Before explaining the present invention in detail it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
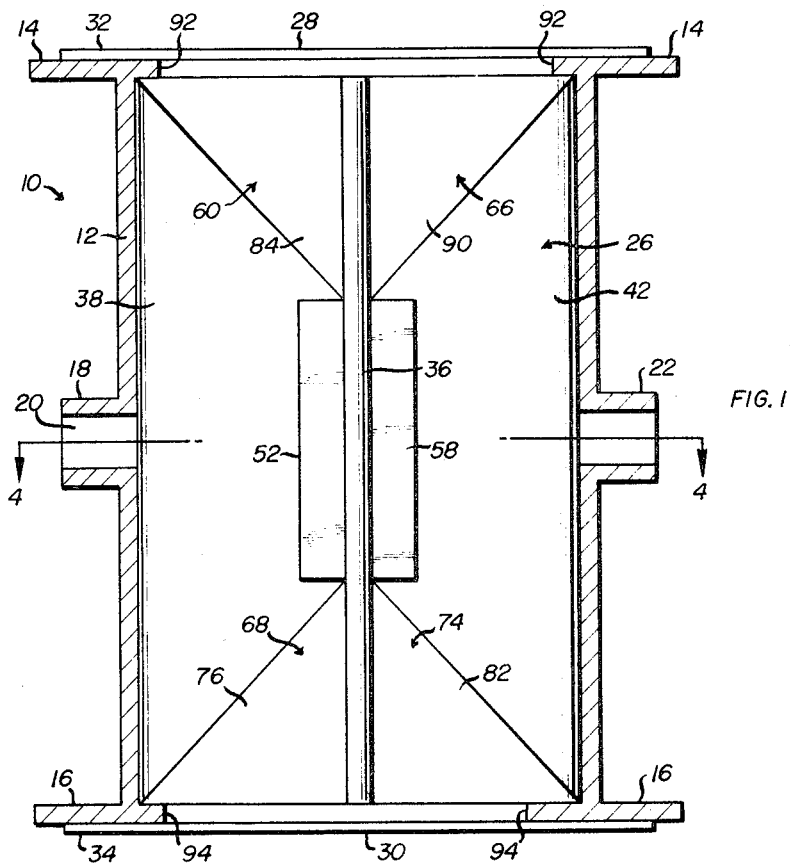
FIGURE 1 is an elevational view, partly in section, showing a valve in accordance with one embodiment of the invention.
Figure 2:
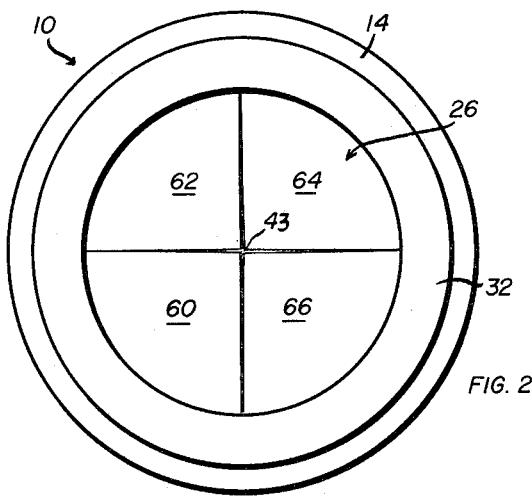
FIGURE 2 is a top plan view of the valve of FIGURE 1.
Figure 4:
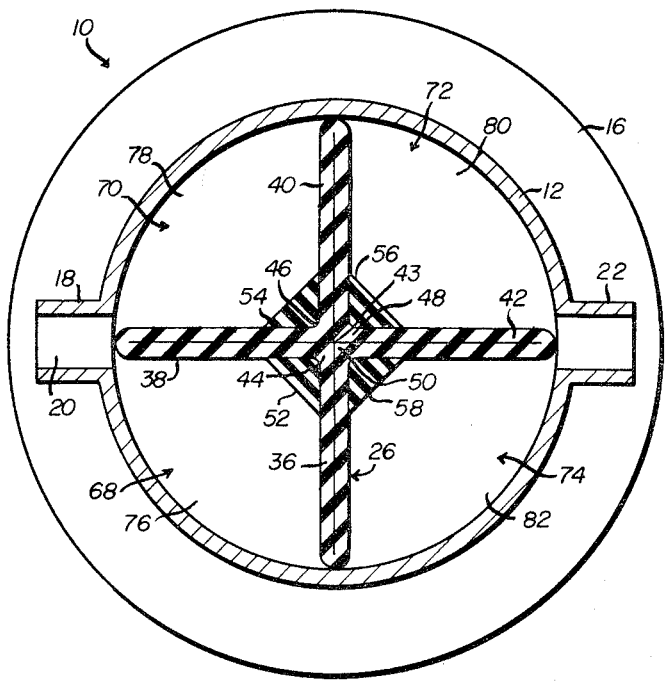
FIGURE 4 is a cross-sectional view taken along line 4—4 of FIGURE 1 with the valve in a closed condition.

As shown in FIGURES 1, 2 and 4, the valve 10 includes a rigid tubular casing 12, preferably made of metal, which has flanges 14 and 16 at its opposite ends and at least one inlet 18 providing a passage 20 leading from the exterior of the casing through the wall thereof into the interior of the casing, two such inlets 18 and 22 being provided in the valve illustrated in the drawings. There may be as many inlets through the casing as desired. Fluid under pressure is introduced into the casing through the inlets 18 and 22 in the operation of the valve, as will be described later.

Inside the casing 12, there is a resilient, flexible valve member 26, which is preferably made of rubber, but which could be made of other resilient, flexible material. The valve member 26 has circular end portions 28 and 30 at its opposite ends, and these end portions have circular flanges 32 and 34 which respectively overlap the flanges 14 and 16 of the casing 12. The circular ends 28 and 30 of the valve member 26 are sealed to the casing 12, and this may be accomplished by squeezing the flanges 32 and 34 against the casing flanges 14 and 16. In operation of the valve 10, the casing flanges 14 and 16 are connected to flanges on suitable piping, and the flanges are drawn together as by means of bolts to squeeze the rubber flanges 32 and 34 of the valve member 26 against the flanges 14 and 16. Thus, when a fluid such as air, which is under pressure, is introduced into the casing 12 through the inlets 18 and 22, it will apply pressure to the valve member 26 inside the casing.

The material of the valve member 26 between the circular end portions 28 and 30 is folded to double thickness to provide folds 36, 38, 40 and 42. These folds extend axially of the valve member 26 and merge into the circular end portions 28 and 30. As seen best in FIGURE 4, the folds also extend radially of the valve member from the outer extremity of the folds to the axis 43 of the valve member. Four such folds are provided in the valve member 26, but it will be understood that two folds, three folds or as many folds as desired may be provided. The valve member 26 has an internal axial passage leading through it, and as shown in FIGURE 4, the folds 36, 38, 40 and 42 meet at the axis 43 of the valve member to close the axial passage. The folds are permanently molded into the valve member 26 so that in the normal undistorted condition of the valve member 26, the folds close the axial passage. In order to seal off the axial passage, air or some other fluid under pressure is introduced through the inlets 18 and 22 into the space between the valve member 26 and the casing 12, and such air acts on the valve member to squeeze the folds 36, 38, 40 and 42 together. Between each adjacent pair of folds, there are apex corners 44, 46, 48 and 50, and the pressurized air acts on these corners to seal them together at the axis 43 of the valve member.

In the illustrated embodiment of the invention, the apex corners 44, 46, 48 and 50 are reinforced by substantially rigid blocks 52, 54, 56 and 58. These blocks may be made of stiff rubber or some other relatively rigid material, and each block has a corner which fits into the corresponding apex corner 44, 46, 48 and 50. This helps to assure that the apex corners on the inside of the valve member at the axle 43 will seal when pressure is applied to the valve member 26.

Providing a transition between the circular end portions 28 and 30 and the folds 36, 38, 40 and 42 are four cusp portions at each end of the valve member 26. The four upper cusp portions 60, 62, 64 and 66 are visible in FIGURE 2, and it will be understood that there are four identical cusp portions at the other or lower end of the valve member, the latter cusp portions being indentified by numerals 68, 70, 72 and 74 and in FIGURE 4. It should be understood, however, that all of the cusp portions have a rigid backing member affixed thereto, and it is actually the backing members 76, 78, 80 and 82 which are visible in FIGURE 4. The backing members 84, 86, 88 and 90 for the cusp portions at the upper end of the valve member are visible in FIGURE 10.

Each of the cusp members slants inwardly from the corresponding circular end portion of the valve member to the axis 43 of the valve member, and portions of the folds 36, 38, 40 and 42 lie between adjacent cusp portions and backing members. Each cusp portion preferably has the shape of a segment of a cone, and since the backing members for the cusp portions are coextensive with the cusp portions, each backing member also has the shape of a segment of a cone. The overall effect of the cusp portions and backing members is to give the valve member 26 a conical shape near its ends which serves as a transition between the circular end portions 28 and 30 and the apex corners 44, 46, 48 and 50 (FIGURE 4).

Figure 3:
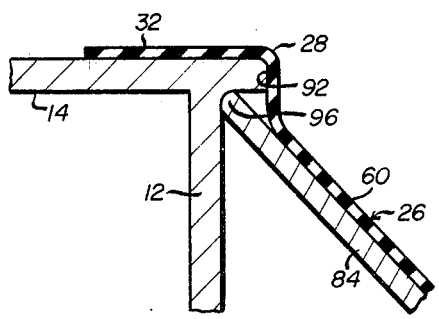
FIGURE 3 is a fragmentary view of a portion of the valve of FIGURE 1 showing how a flexible valve member is sealed to a rigid casing and a stiffener for the valve member is hinged at a portion of the casing.

In FIGURE 3, fragmentary portions of the valve member 26 and the casing 12 are shown to illustrate the manner in which the valve member and the backing members for the cusp portions are joined to the casing 12. The cusp portion 60 is affixed to and backed by the backing member 84. The cusp portion 60 merges into the circular end portion 28 of the valve member 26, and it may be seen that the circular flange 32 of the valve member overlies the flange 14 of the casing 12. The flange 14 projects slightly inwardly of the side wall of the casing 12 to form a lip 92. A similar lip 94 is formed at the lower end of the casing 12 FIGURE 1). The backing member 84 for the cusp portion 60 terminates at an end 96 which fits under a lip 92 as shown in FIGURE 3. Thus, there is a hinged connection between the backing member 84 and the lip 82 which allows the backing member 84 to pivot about its end 96. This pivotal movement takes place when the valve member 26 is opened.

Figure 5:
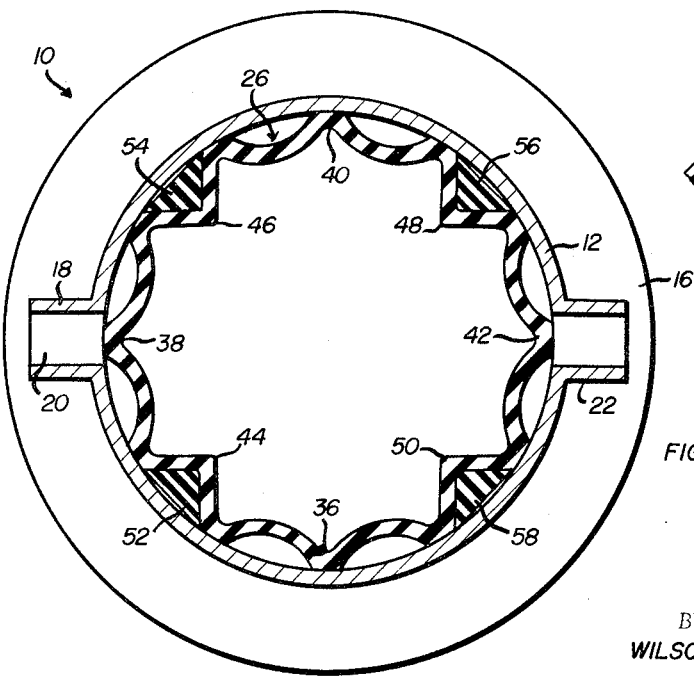
FIGURE 5 is a cross-sectional view similar to FIGURE 4, but showing the valve in an open condition.

The closed condition of the valve member 26 is illustrated in FIGURES 1, 2, 4 and 8. The open condition of the valve member is illustrated by FIGURES 5, 9 and 10. The valve 10 might be provided in a pipeline, by way of example, to control the flow of liquid through the pipeline. If the pressure on the outside of the valve member 26 is greater than the pressure of liquid flowing in the pipeline and attempting to flow through the valve member 26, the valve member will be in its closed condition. If, however, the pressure of the liquid attempting to flow inside of the valve member is greater than the pressure on the outside of the valve member, the valve member will open up as illustrated best in FIGURES 5 and 10. In FIGURE 5, it may be seen that the folds 36, 38, 40 and 42 have opened up, and the apex corners 44, 46, 48 and 50 have been forced outwardly toward the side wall of the casing 12. At the same time, the cusp portions and associated backing members have expanded, and the backing members have pivoted outwardly to the condition shown in FIGURE 10. In FIGURE 8, a part of the valve member is shown in its closed condition, and it may be seen that the upper end 96 of the backing member 84 is horizontal. However, when the valve member 26 opens up, the backing member 84 pivots to the position shown in FIGURE 9 wherein part of the upper end 96 of the backing member 84 has pulled away from the circular end portion 26 of the valve member. It may be seen in FIGURE 9, that the upper end 96 of the backing member 84 curves from a tangent point at 100 downwardly to corner portions 102 and 104. In order for these corners 102 and 104 to pull away from the circular end portion 28 of the valve member 26, the rubber material adjacent to the backing member 84 must either stretch adjacent the corners 102 and 104, or a small fold must be provided to allow the downward movement of the corners 102 and 104.

Figure 6:
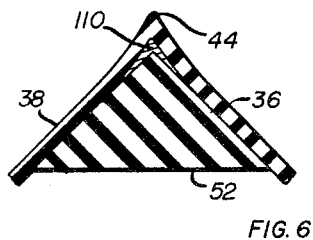
FIGURE 6 is a fragmentary view of one apex corner of the valve member showing one way of providing soft resilient material at the apex corner.
Figure 7:
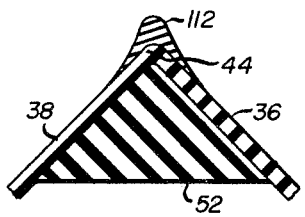
FIGURE 7 is another fragmentary sectional view of an apex corner of the valve member showing another way of providing soft resilient material at the apex corner.

FIGURES 6 and 7 show one apex corner 44 of the valve member 26 together with its stiffening block 52, and illustrate how soft, resilient material may be utilized to make the corner 44 project beyond its normal position so as to assure a good seal at the axis 43 of the valve member. In FIGURE 6, a quantity of soft, readily yieldable rubber 110 has been provided between the apex corner 44 and the corresponding corner of the stiff rubber block 52, and this makes the apex corner 44 project slightly beyond the corner of block 52. Thus, all of the apex corners will squeeze against each other to provide a good seal at the axis of the valve member. In FIGURE 7, a quantity 112 of soft, yieldable rubber or other appropriate material has been provided directly on the apex corner 44 of the valve member to effectively make the apex corner project toward the axis of the valve member. This also results in a good seal at the axis of the valve member.

Having thus described my invention, I claim:

1. A valve comprising a rigid tubular casing, a valve member in said casing made of resilient, flexible material and having an axial passage through the same, said valve member being coaxial with said casing and having circular end portions to be sealed to said casing, the material of said valve member between said circular end portions being folded to double thickness with the folds extending axially of said valve member and radially to the axis of said valve member, and said valve member further having cusp portions between at least portions of said folds slanting inwardly from said circular end portions toward the axis of said valve member so that when pressure is applied to the exterior of said valve member said internal passage is closed, said folds and said cusp portions being expandable when the pressure inside said valve member exceeds the pressure outside the same to open said passage, rigid means backing said cusp portions and substantially coextensive therewith to inhibit distortion of said cusp portions when pressure is applied to said valve member, and inlet means leading through said casing for introducing fluid into said casing on the outside of said valve member to apply pressure to said valve member to close said passage.

2. The valve of claim 1 in which each of said cusp portions and each of said rigid means has the shape of a segment of a cone.

3. The valve of claim 1 in which each of said cusp portions has the shape of a segment of a cone.

4. The valve of claim 1 in which adjoining folds of said valve member are joined together at apexes, and in which stiffening means is affixed to each said apex to assist in obtaining a seal at said apexes.

5. The valve of claim 4 in which each of said stiffening means comprises a block more rigid than the material of said valve member.

6. The valve of claim 5 in which each of said blocks has a corner fitting into the respective apex to reinforce the corner of said apex.

7. The valve of claim 6 in which material more yieldable than said valve member is provided at each said apex corner to make said apex corners protrude toward the axis of said valve member to assist in obtaining a seal.

8. A valve comprising a rigid tubular casing, a resilient flexible valve member in said casing having an axial passage through the same and first and second circular end portions to be sealed to said casing, inlet means leading through said casing for introducing fluid into said casing on the outside of said valve member to apply pressure to said valve member, said valve member having cusp portions slanting inwardly from said circular end portions toward the axis of said valve member, and said valve member having folds extending axially thereof partly between said cusp portions and extending radially of said valve member to the axis thereof to form apex corners between adjoining folds which meet each other at said axis to close said passage when external pressure is applied to said valve member, and rigid means backing said cusp portions of said valve member and coextensive therewith to prevent distortion of said cusp portions when pressure is applied to said valve member, said cusp portions and said folds being expandable to open said passage when a pressure inside said valve member exceeds a pressure outside the same.

9. A valve as claimed in claim 8 and further including means reinforcing said apex corners of said valve member.

10. A valve as claimed in claim 9 in which said reinforcing means comprises substantially rigid blocks affixed to and conforming to said apex corners and located on the outside of said valve member.

11. A valve as claimed in claim 8 in which said rigid means comprises metal members affixed to said cusp portions on the exterior side thereof.

12. A valve as claimed in claim 11 in which said metal member and said cusp portions have the shape of a segment of a cone.

13. A valve comprising a rigid tubular casing having an outwardly radially projecting flange at each end thereof and an inwardly radially projecting lip at each end thereof, a resilient flexible valve member in said casing having an axis, an axial passage through the same and first and second circular end portions overlapping and abutting said flanges of said casing, said valve member having a medial part between said end portions wherein the material of said valve member is folded to double thickness at a plurality of places with the folds extending axially of said valve member to merge into said end portions and also extending radially of said valve member so that said folds form apex corners between adjoining folds which meet each other at said axis to seal axial passage when pressure is applied to the exterior of said valve member, stiffening blocks affixed to and fitting in said apex corners on the exterior thereof for reinforcing said corners, said valve member further having cusp portions between said folds slanting inwardly from said end portions to said axis and having the shape of a segment of a cone, rigid backing members affixed respectively to the exterior of said cusp portions for stiffening the same, said backing members having the shape of a segment of a cone and being substantially coextensive with said cusp portions, and said backing members each having an edge abutting a respective one of said lips of said casing to allow pivotal movement of said backing members about said edge, and inlet means leading through said casing through which fluid may be introduced into said casing to apply pressure to the outside of said valve member to seal said passage, said folds and said cusp portions being expandable when the pressure inside said valve member exceeds the pressure outside the same to open said passage, with said backing members and said stiffening blocks moving with said valve member upon expansion and contraction thereof.

References Cited

UNITED STATES PATENTS 2,641,282 6/1953 Hazlett _____ 251—5
3,292,718 12/1966 Stone _____ 251—5 XR

FOREIGN PATENTS 513,821 9/1952 Belgium.
59,025 11/1936 Norway.

WILLIAM F. O'DEA, Primary Examiner
RICHARD GERARD, Assistant Examiner

U.S. Cl. X.R.

92—93